US011924039B2

United States Patent
Hung et al.

(10) Patent No.: US 11,924,039 B2
(45) Date of Patent: Mar. 5, 2024

(54) SYSTEM AND METHOD FOR OPTIMIZATION OF NETWORK FUNCTION MANAGEMENT AND COMPUTER READABLE MEDIUM THEREOF

(71) Applicant: CHUNGHWA TELECOM CO., LTD., Taoyuan (TW)

(72) Inventors: Yuan-Mao Hung, Taoyuan (TW); Mao-Yao Lee, Taoyuan (TW); Chien-Hua Lee, Taoyuan (TW); Shih-Che Chien, Taoyuan (TW)

(73) Assignee: CHUNGHWA TELECOM CO., LTD., Taoyuan (TW)

( * ) Notice: Subject to any disclaimer, the term of this patent is extended or adjusted under 35 U.S.C. 154(b) by 0 days.

(21) Appl. No.: 17/951,394

(22) Filed: Sep. 23, 2022

(65) Prior Publication Data

US 2023/0136061 A1 May 4, 2023

(30) Foreign Application Priority Data

Oct. 28, 2021 (TW) .................. 110140086

(51) Int. Cl.
*H04L 41/0895* (2022.01)
*H04L 41/0806* (2022.01)
*H04L 41/084* (2022.01)
*H04L 41/40* (2022.01)

(52) U.S. Cl.
CPC ...... *H04L 41/0895* (2022.05); *H04L 41/0806* (2013.01); *H04L 41/084* (2013.01); *H04L 41/40* (2022.05)

(58) Field of Classification Search
CPC ............. H04L 41/0895; H04L 41/0806; H04L 41/084; H04L 41/40
See application file for complete search history.

(56) References Cited

U.S. PATENT DOCUMENTS

| 2014/0317293 | A1* | 10/2014 | Shatzkamer | H04L 41/5054 709/226 |
| 2019/0065323 | A1* | 2/2019 | Dhamdhere | G06F 11/1484 |
| 2021/0144517 | A1* | 5/2021 | Guim Bernat | H04W 12/04 |
| 2021/0318824 | A1* | 10/2021 | Cain | G06F 3/0644 |
| 2021/0326167 | A1* | 10/2021 | Yang | G06F 9/5077 |
| 2022/0004410 | A1* | 1/2022 | Chen | G06F 8/63 |
| 2022/0232100 | A1* | 7/2022 | Christofi | H04W 4/50 |
| 2022/0312295 | A1* | 9/2022 | Hashemi | H04W 28/12 |

FOREIGN PATENT DOCUMENTS

SE 544020 C2 * 11/2021 ............. G06F 21/53

* cited by examiner

*Primary Examiner* — Schquita D Goodwin
*Assistant Examiner* — Linh T. Nguyen
(74) *Attorney, Agent, or Firm* — Amin, Turocy & Watson, LLP (57) ABSTRACT

Provided are a system and a method for optimization of network function management and computer readable medium thereof that develop an OAM system architecture compatible with a standard MANO framework set by ETSI, so as to effectively integrate and manage the resources and situation configurations of the network elements (including VNF and CNF) of different manufacturers. Therefore, containment management for various network elements may be flexibly integrated, advantages of the standard MANO framework may be preserved, cost for customized development of various OAM systems and the information transmission therefrom may be reduced, and overall efficiency is increased.

19 Claims, 9 Drawing Sheets

SYSTEM AND METHOD FOR OPTIMIZATION OF NETWORK FUNCTION MANAGEMENT AND COMPUTER READABLE MEDIUM THEREOF

BACKGROUND

1. Technical Field

The present disclosure relates to telecommunication cloud and cloud-native management technology, and more particularly, to system and method for optimization of network function management and computer readable medium thereof.

2. Description of the Prior Art

With the development of a fifth-generation mobile communications (5G) technology, a Network Function (NF) based on the 5G core network has gradually developed from a Virtualized Network Function (VNF) to a Container Network Function (CNF). Generally, domestic and foreign manufacturers mainly adopt a customized Operations, Administration and Management (OAM) systems for resource management of various network elements (for example, the various NFs mentioned above) to perform individual resource management for their VNF or CNF. However, this resource management method not only lacks universality, but also increases the cost of customized development of the OAM systems and the cost of information transmission between various OAM systems, thereby resulting in low overall efficiency.

Therefore, how to develop a universal OAM system architecture to effectively integrate and manage the resources and situation configuration of network elements (including VNF and CNF) of different manufacturers has become one of the urgent issues in this field.

SUMMARY

The present disclosure provides a system for optimization of network function management, which is compatible with a management and orchestration framework or architecture, the system comprises: a software network service orchestration control module for analyzing a type of a network element corresponding to a containment request from the management and orchestration framework or architecture; a software network service management module for executing a first resource containment processing of virtualized network functions when the network element corresponding to the containment request belongs to a type of the virtualized network functions; and a container network service management module for executing a second resource containment processing of containerized network functions when the network element corresponding to the containment request belongs to a type of the containerized network functions.

In the foregoing system, the software network service orchestration control module comprises: a service request receiving and analysis management unit for querying a connection information based on a configuration information and an authority information included in the containment request; and a service situation knowledge base for maintaining the connection information, wherein the connection information defines that a network resources and services for installing interface module at an underlayer of the management and orchestration framework or architecture corresponds to the software network service management module or a containerized service management module corresponds to the container network service management module, and wherein the software network service management module and the network resources and services for installing interface module are related to the first resource containment processing, and the containerized service management module and the container network service management module are related to the second resource containment processing.

In the foregoing system, the software network service management module comprises: a service analysis receiving and management unit for integrating a flow of the first resource containment processing according to the containment request; a network element resource management unit for executing the first resource containment processing of the virtualized network functions to the network resources and services for installing interface module at an underlayer of the management and orchestration framework or architecture; and a network service resource management knowledge base for maintaining a configuration data of the virtualized network functions registered at the network resources and services for installing interface module.

In the foregoing system, a manner in which the software network service management module executes the first resource containment processing of the virtualized network functions comprises: in response to the containment request, obtaining the configuration data from the network service resource management knowledge base via the service analysis receiving and management unit; obtaining basic template stacks including instances and network information in each of the virtualized network functions from the network resources and services for installing interface module via the network element resource management unit; dividing each of the virtualized network functions according to the basic template stacks by the network element resource management unit to calculate a post-completion configuration data required for each of the virtualized network functions according to configurations and the network information of the instances of each of the basic template stacks; executing the first resource containment processing of each of the virtualized network functions to the network resources and services for installing interface module by the network element resource management unit to respond to the service analysis receiving and management unit with the post-completion configuration data completed the first resource containment processing; and instantiating the post-completion configuration data by the service analysis receiving and management unit to update the post-completion configuration data to the configuration data of the network service resource management knowledge base.

In the foregoing system, the service analysis receiving and management unit is used to periodically instruct the network element resource management unit to check the network resources and services for installing interface module for a change of each of the virtualized network functions.

In the foregoing system, the service analysis receiving and management unit is further used to register the network element to the network resources and services for installing interface module to update the configuration data of the network service resource management knowledge base.

In the foregoing system, the container network service management module comprises: a service analysis receiving and management unit for integrating a flow of the second resource containment processing according to the containment request; a network element resource management unit for executing the second resource containment processing of the containerized network functions to a containerized service management module at an underlayer of the management and orchestration framework or architecture; a network element situation configuration management unit for collecting a situation configuration of the containerized network functions; and a network service resource management knowledge base for maintaining a configuration data and the situation configuration of the containerized network functions registered at the containerized service management module.

In the foregoing system, a manner in which the container network service management module executes the second resource containment processing of the containerized network functions comprises: in response to the containment request, obtaining the configuration data from the network service resource management knowledge base via the service analysis receiving and management unit; obtaining basic container information including small clusters, containers and network information in each of the containerized network functions from the containerized service management module via the network element resource management unit; dividing each of the containerized network functions according to a helm template and a namespace by the network element resource management unit to calculate a post-completion configuration data required for each of the containerized network functions according to configurations and the network information of the small clusters and the containers of each of the basic container information; executing the second resource containment processing of each of the containerized network functions to the containerized service management module by the network element resource management unit to respond to the service analysis receiving and management unit with the post-completion configuration data completed the second resource containment processing; analyzing and obtaining the situation configuration of each of the containerized network functions belonging to stand alone network elements according to the post-completion configuration data by the network element situation configuration management unit; and instantiating the post-completion configuration data and the situation configuration by the service analysis receiving and management unit to update the post-completion configuration data and the situation configuration to the configuration data and the situation configuration of the network service resource management knowledge base.

In the foregoing system, the service analysis receiving and management unit is used to periodically instruct the network element resource management unit to check the containerized service management module for a change of each of the containerized network functions.

In the foregoing system, the service analysis receiving and management unit is further used to register the network element to the containerized service management module to update the configuration data of the network service resource management knowledge base.

The present disclosure further provides a method for optimization of network function management, which is employed in a management and orchestration framework or architecture, the method comprising: analyzing a type of a network element corresponding to a containment request from the management and orchestration framework or architecture by a software network service orchestration control module; and executing a first resource containment processing of virtualized network functions by a software network service management module when the network element belongs to a type of the virtualized network functions, and executing a second resource containment processing of containerized network functions by a container network service management module when the network element belongs to a type of the containerized network functions.

In the foregoing method, the step of analyzing the type of the network element corresponding to the containment request from the management and orchestration framework or architecture by the software network service orchestration control module comprises the following substeps: querying a connection information by analyzing a configuration information and an authority information included in the containment request via a service request receiving and analysis management unit of the software network service orchestration control module; and returning the connection information by a service situation knowledge base of the software network service orchestration control module, wherein the connection information defines that a network resources and services for installing interface module at an underlayer of the management and orchestration framework or architecture corresponds to the software network service management module or a containerized service management module corresponds to the container network service management module, and wherein the software network service management module and the network resources and services for installing interface module are related to the first resource containment processing, and the containerized service management module and the container network service management module are related to the second resource containment processing.

In the foregoing method, the step of executing the first resource containment processing of the virtualized network functions by the software network service management module comprises the following substeps: in response to the containment request, obtaining a configuration data of the virtualized network functions registered at an underlayer of a network resources and services for installing interface module of the management and orchestration framework or architecture from a network service resource management knowledge base of the software network service management module via a service analysis receiving and management unit of the software network service management module; obtaining basic template stacks including instances and network information in each of the virtualized network functions from the network resources and services for installing interface module via a network element resource management unit of the software network service management module; dividing each of the virtualized network functions according to the basic template stacks by the network element resource management unit to calculate a post-completion configuration data required for each of the virtualized network functions according to configurations and the network information of the instances of each of the basic template stacks; executing the first resource containment processing of each of the virtualized network functions to the network resources and services for installing interface module by the network element resource management unit to respond to the service analysis receiving and management unit with the post-completion configuration data completed the first resource containment processing; and instantiating the post-completion configuration data by the service analysis receiving and management unit to update the post-completion configuration data to the configuration data of the network service resource management knowledge base.

In the foregoing method, the step of executing the first resource containment processing of the virtualized network functions by the software network service management module further comprises the following substeps: periodically instructing the network element resource management unit to check the network resources and services for installing interface module for a change of each of the virtualized network functions by the service analysis receiving and management unit.

In the foregoing method, the step of executing the first resource containment processing of the virtualized network functions by the software network service management module further comprises the following substeps: registering the network element to the network resources and services for installing interface module by the service analysis receiving and management unit to update the configuration data of the network service resource management knowledge base.

In the foregoing method, the step of executing the second resource containment processing of the containerized network functions by the container network service management module comprises the following substeps: in response to the containment request, obtaining a configuration data of the containerized network functions registered in a containerized service management module at an underlayer of the management and orchestration framework or architecture from a network service resource management knowledge base of the container network service management module via a service analysis receiving and management unit of the container network service management module; obtaining basic container information including small clusters, containers and network information in each of the containerized network functions from the containerized service management module via a network element resource management unit of the container network service management module; dividing each of the containerized network functions according to a helm template and a namespace by the network element resource management unit to calculate a post-completion configuration data required for each of the containerized network functions according to configurations and the network information of the small clusters and the containers of each of the basic container information; executing the second resource containment processing of each of the containerized network functions to the containerized service management module by the network element resource management unit to respond to the service analysis receiving and management unit with the post-completion configuration data completed the second resource containment processing; analyzing and obtaining a situation configuration of each of the containerized network functions belonging to stand alone network elements according to the post-completion configuration data by a network element situation configuration management unit of the container network service management module; and instantiating the post-completion configuration data and the situation configuration by the service analysis receiving and management unit to update the post-completion configuration data and the situation configuration to the configuration data and the situation configuration of the network service resource management knowledge base.

In the foregoing method, the step of executing the second resource containment processing of the containerized network functions by the container network service management module further comprises the following substeps: periodically instructing the network element resource management unit to check the containerized service management module for a change of each of the containerized network functions by the service analysis receiving and management unit.

In the foregoing method, the step of executing the second resource containment processing of the containerized network functions by the container network service management module further comprises the following substeps: registering the network element to the containerized service management module by the service analysis receiving and management unit to update the configuration data of the network service resource management knowledge base.

In addition, a computer readable medium of the present disclosure is used in a computing device or a computer, and stores instructions to execute the foregoing method for optimization of network function management.

In summary, the system and method for optimization of network function management and computer readable medium thereof of the present disclosure develop an OAM system architecture compatible with a standard MANO framework set by ETSI, so as to effectively integrate and manage the resources and situation configurations of the network elements (including VNF and CNF) of different manufacturers. Therefore, containment management for various network elements may be flexibly integrated, advantages of the standard MANO framework may be preserved, cost for customized development of various OAM systems and the information transmission therefrom may be reduced, and overall efficiency is increased.

DETAILED DESCRIPTION

The following illustrative embodiments are provided to illustrate the present disclosure, these and other advantages and effects can be apparently understood by those in the art after reading the disclosure of this specification. The structures, ratios, sizes, and the like in the accompanying figures are used to illustrate the content disclosed in the present specification for one skilled in the art to read and understand, rather than to limit the conditions for practicing the present disclosure. Therefore, any modification, change or adjustment shall still fall within the scope of the technical content disclosed in the present disclosure without affecting the effects and objectives that can be achieved in the present disclosure.

Figure 1:
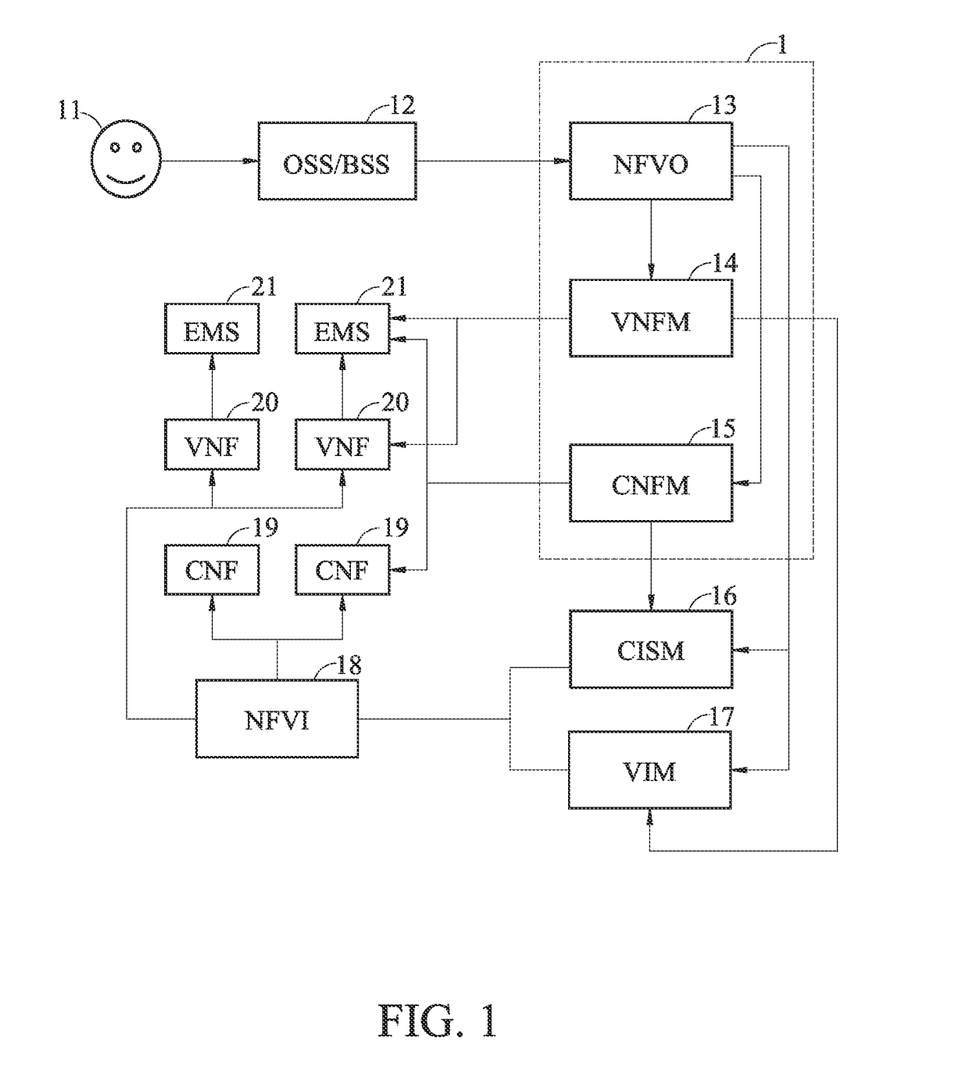
FIG. 1 is a schematic diagram of an application environment of a system and method according to the present disclosure.

FIG. 1 is a schematic view of an application environment of a system and a method for optimization of network function management according to the present disclosure. In detail, a universal operation management and maintenance (i.e., Operations, Administration and Management or OAM) system 1 developed by the present disclosure is compatible with a standard Management and Orchestration (MANO)

framework or architecture (the architecture shown in FIG. 1 is an NFV MANO framework) drawn up by the European Telecommunications Standards Institute (ETSI), such that the OAM system 1 uses general service instantiation in the MANO framework or architecture to analyze and process and contain network element resources, and then flexibly manages network element resources and situation configurations of Virtualized Network Functions (VNF) 20 and/or Container Network Functions (CNF) 19 from different manufacturers to ensure the flexibility and scalability of the MANO standard framework.

In one embodiment, the MANO framework or architecture shown in FIG. 1 mainly comprises the following elements: a telecom operation support system (i.e., Operations Support System and Business Support System, OSS/BSS) 12, a software network service orchestration control module (i.e., Network Functions Virtualization Orchestrator, NFVO) 13, a software network service management module (i.e., VNF Manager, VNFM) 14, a container network service management module (i.e., CNF Manager, CNFM) 15, a containerized service management module (i.e., Container Infrastructure Service Manager, CISM) 16, a network resources and services for installing interface module (i.e., Virtualized Infrastructure Manager, VIM) 17, a Network Functions Virtualization Infrastructure (NFVI) 18, a CNF 19, a VNF 20 and a network element management system (i.e., Element Management System, EMS) 21. Further, the arrows connected between the elements shown in FIG. 1 represent that a user 11 uses a MANO framework or architecture compatible with the OAM system 1 to install and manage the network elements (for example, CNF 19 and VNF 20) to be contained and/or already contained, the communication connection relationship between the elements, and the relationship between the elements for installation management will be described in detail later.

In one embodiment, each element in FIG. 1 can be a software, a hardware, or a firmware; if it is a hardware, it can be a processing unit, a processor, a computer, or a server with data processing and computing capabilities; and if it is a software or a firmware, it may include instructions executable by the processing unit, processor, computer, or server.

Figure 2:
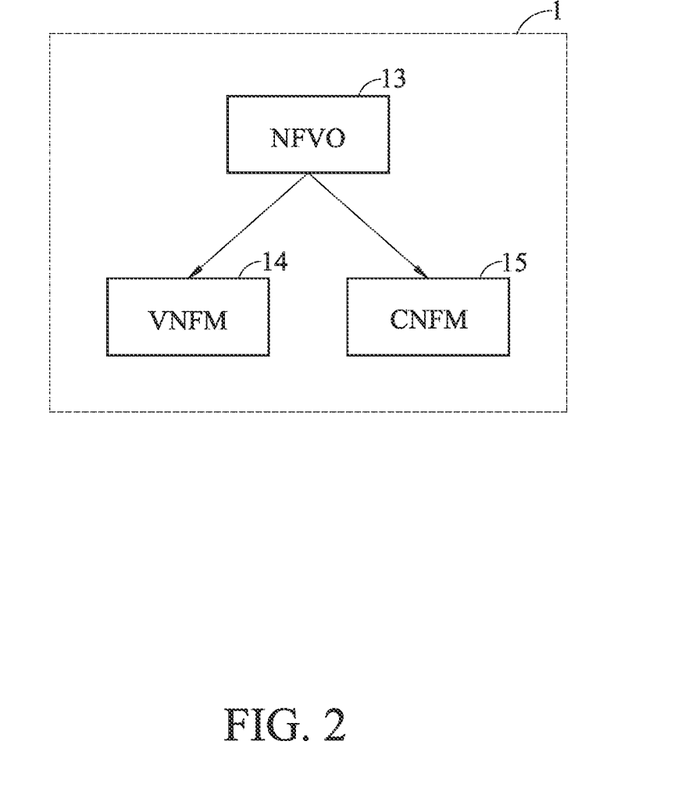
FIG. 2 is a diagram of a module architecture of the system according to the present disclosure.

FIG. 2 illustrates a configuration relationship between the main elements in the OAM system 1 shown in FIG. 1. In detail, FIG. 2 is mainly used to show that NFVO 13 sends a containment request to VNFM 14 or CNFM 15 according to the type of network element corresponding to the containment request (i.e., VNF or CNF) after receiving the containment request of the network element submitted by the user 11 to the OSS/BSS 12, so as to perform a resource containment processing of the related VNF 20 or CNF 19.

Figure 3:
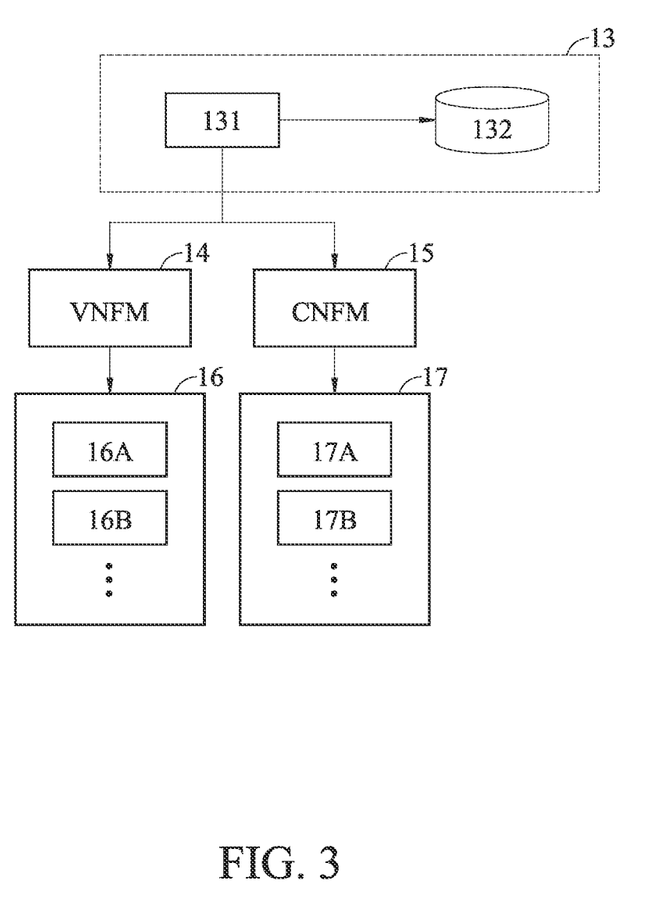
FIG. 3 is a diagram of a partial module architecture of the system according to the present disclosure.

FIG. 3 illustrates the detailed elements included in the NFVO 13 and a configuration relationship between the NFVO 13 and other elements. In detail, a service request receiving and analysis management unit 131 is responsible for analyzing the type of network element corresponding to the containment request submitted by the user 11 to the OSS/BSS 12, and then instructs the VNFM 14 or CNFM 15 to execute resource containment processing of the network element. On the other hand, a service situation knowledge base 132 uses MongoDB as a document-oriented database system to maintain a record of the connection information of VIM 17 (for example, one of VIM A 17A, VIM B 17B . . . ) corresponding to VNFM 14, or CISM 16 (for example, one of CISM A 16A, CISM B 16B . . . ) corresponding to CNFM 15 under the current MANO framework. Further, in one embodiment, the CISM 16 and VIM 17 described herein are underlying management systems implemented by the open source kubernetes project and the Openstack open source project, respectively, such that when the VNFM 14 and CNFM 15 execute processing procedures of the network element according to the corresponding CISM 16 and VIM 17, there are also different implementation manners, which will be described in detail later.

Figure 4:
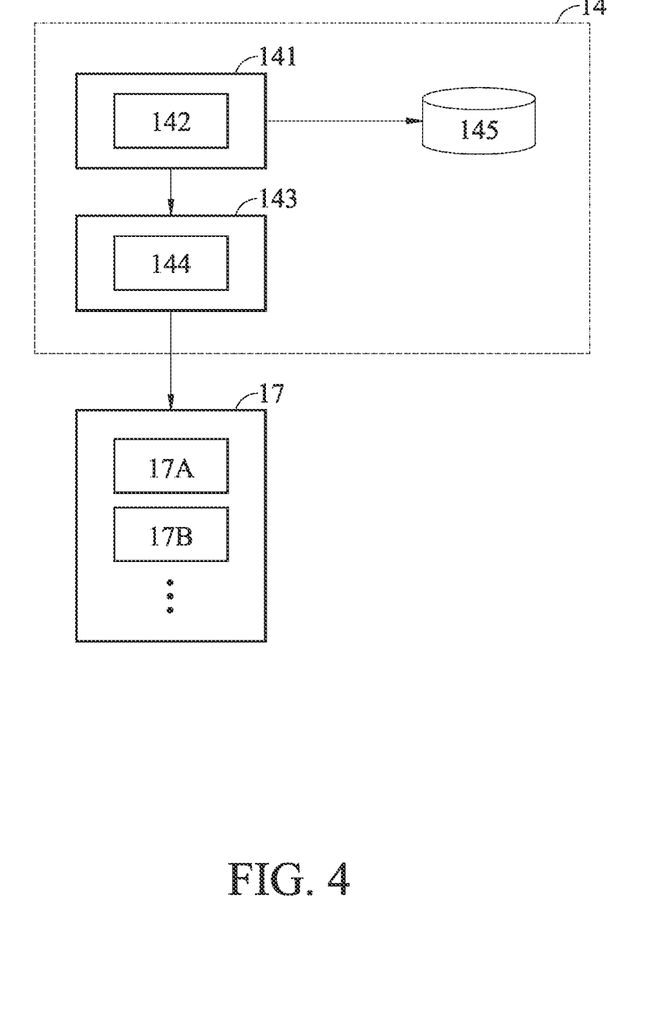
FIG. 4 is a diagram of a partial module architecture of the system according to the present disclosure.

FIG. 4 illustrates the detailed elements included in the VNFM 14 and a configuration relationship between the VNFM 14 and other elements. In detail, a VNF service analysis receiving and management unit 141 is used to integrate the resource containment processing flow of the VNF 20 to the corresponding VNFM 14 according to the containment request sent by the service request receiving and analysis management unit 131 (after it is determined that the type of the network element corresponding to the containment request is VNF). A VNF network element resource management unit 143 is used to cooperate with a built-in VNF network element collection and management interface application 144 to cater to the analysis of the containment request by the VNF service analysis receiving and management unit 141, so as to execute the resource containment processing of the VNF 20 at the VIM 17 (for example, one of VIM A 17A, VIM B 17B . . . ). On the other hand, a VNF network service resource management knowledge base 145 uses MongoDB as a document-oriented database system to maintain the configuration data of the VNF 20 for resource containment processing at the VIM 17. Further, in one embodiment, the VNF service analysis receiving and management unit 141 also has a built-in VNF network element collection management scheduling application 142, which is used to periodically instruct the VNF network element resource management unit 143 to check with the VIM 17 whether the network element resources of the VNF 20 contained in it are changed, and then instruct the VNFM 14 to restart the resource containment processing of the VNF 20 according to the situation.

Figure 5:
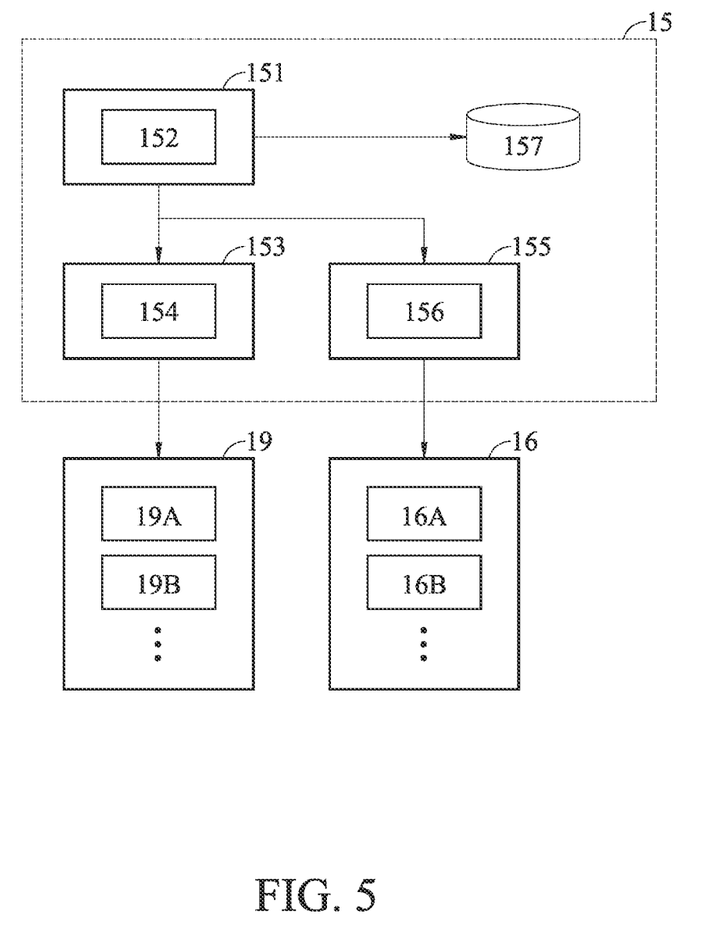
FIG. 5 is a diagram of a partial module architecture of the system according to the present disclosure.

FIG. 5 illustrates the detailed elements included in the CNFM 15 and a configuration relationship between the CNFM 15 and other elements. In detail, a CNF service analysis receiving and management unit 151 is used to integrate the resource containment processing flow of CNFM 15 to the corresponding CNF 19 according to the containment request sent by the service request receiving and analysis management unit 131 (after it is determined that the type of the network element corresponding to the containment request is CNF). A CNF network element resource management unit 155 is used to cooperate with a built-in CNF container service management interface application 156 to cater to the analysis of the containment request by the CNF service analysis receiving and management unit 151, so as to execute the resource containment processing of CNF 19 at CISM 16 (for example, one of CISM A 16A, CISM B 16B . . . ). A CNF network element situation configuration management unit 153 is used to cooperate with a built-in CNF network element open service-oriented interface (Service Based Interface, SBI) interface application 154 to cater to the analysis of the containment request by the CNF service analysis receiving and management unit 151, so as to collect a situation configuration of the 5G stand alone (SA) network elements in the CNF 19 (for example, any one of CNF A 19A, CNF B 19B . . . ) contained in the current MANO framework. On the other hand, a CNF network service resource management knowledge base 157 uses MongoDB as a document-oriented database system to maintain the configuration data and/or its situation configuration of the CNF 19 for resource containment processing at the CISM 16. Further, in one embodiment, the CNF service analysis receiving and management unit 151 also has a built-in CNF network element collection management scheduling application 152, which is used to periodically instruct the CNF network element resource management unit 155 to check with the CISM 16 whether the network element resources of the CNF 19 contained in it are changed, and then instruct the CNFM 15 to restart the resource containment processing of the CNF 19 according to the situation.

Figure 6:
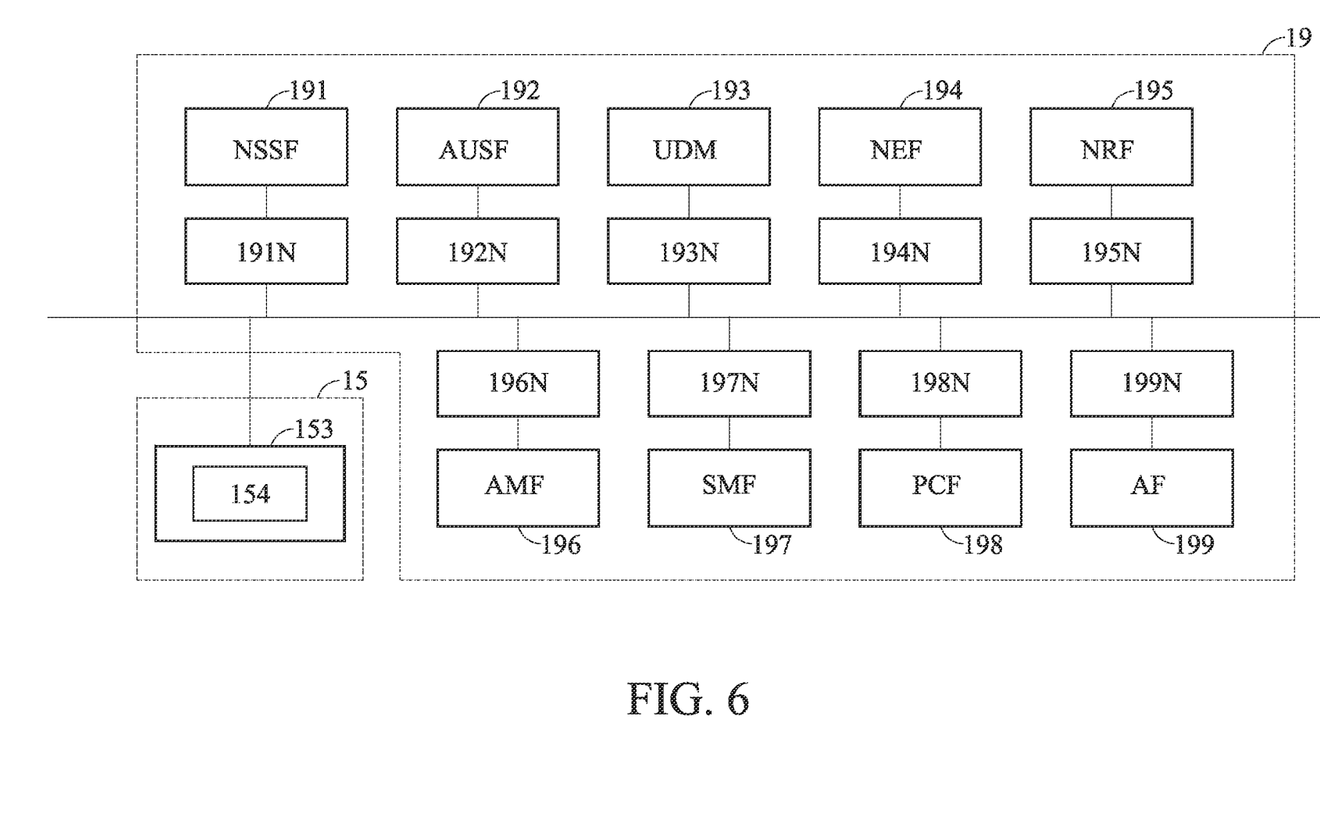
FIG. 6 is a diagram of a partial module architecture of the system according to the present disclosure.

FIG. 6 further illustrates that when CNF 19 belongs to a 5G SA network element, the CNF network element situation configuration management unit 153 cooperates with the CNF network element open SBI interface application 154 to access various implementations of CNF 19. In detail, a CNF 19 belonging to 5G SA network elements (take 5GC CNF network elements as an example) includes a Network Slice Selection Function (NSSF) 191, an Authentication Server Function (AUSF) 192, an Unified Data Management (UDM) function 193, a network business presentation function (i.e., Network Exposure Function, NEF) 194, a network element data warehouse function (i.e., NF Repository Function, NRF) 195, an Access and Mobility Management Function (AMF) 196, a Session Management Function (SMF) 197, a Policy Control Function (PCF) 198 and an Application Function (AF) 199, etc. Further, in one embodiment, the CNF network element open SBI interface application 154 mainly accesses these network elements via northbound SBI interfaces (take 5GC SBI as an example) 191N to 199N corresponding to the above-mentioned types of network elements 191 to 199, and then obtains the situation configurations of these network elements.

Figure 7:
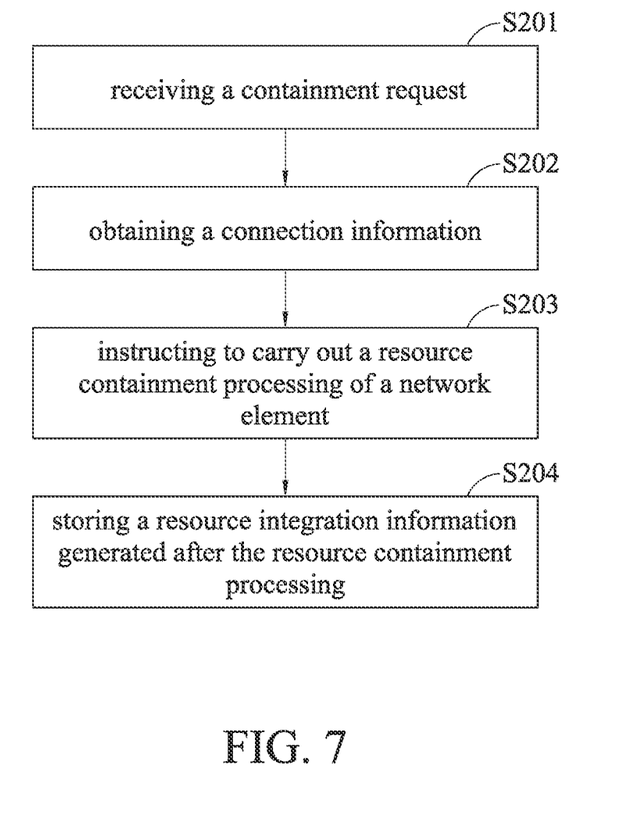
FIG. 7 is a flowchart of partial steps of the method according to the present disclosure.
Figure 8:
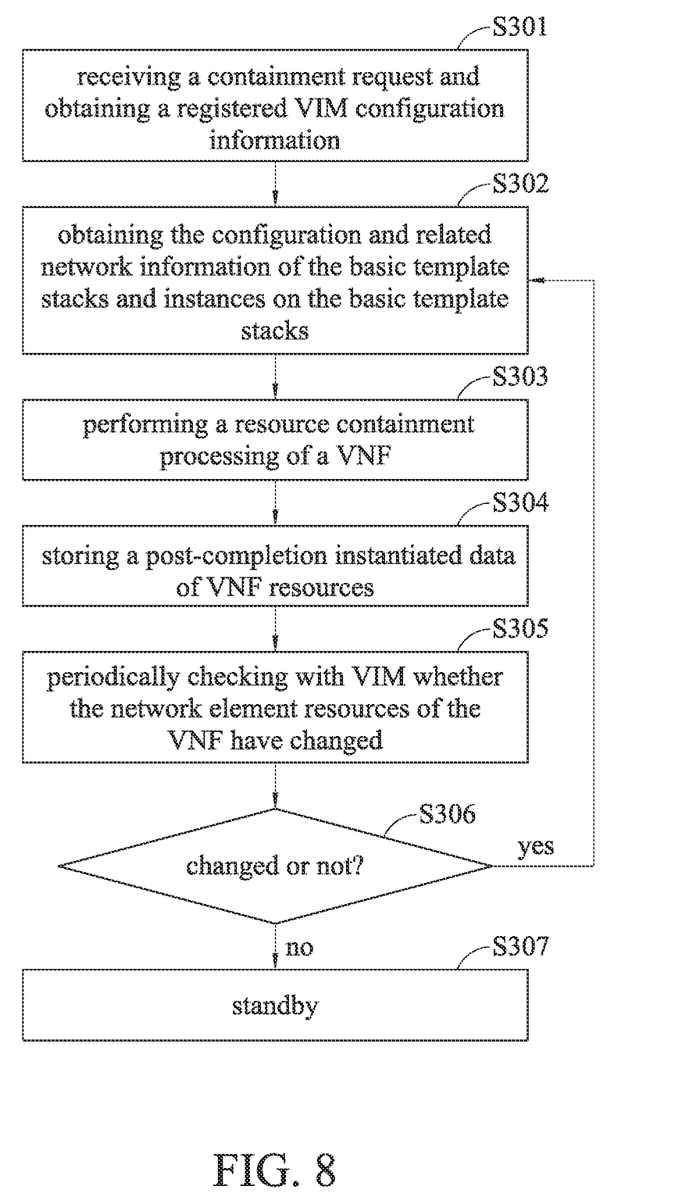
FIG. 8 is a flowchart of partial steps of the method according to the present disclosure.
Figure 9:
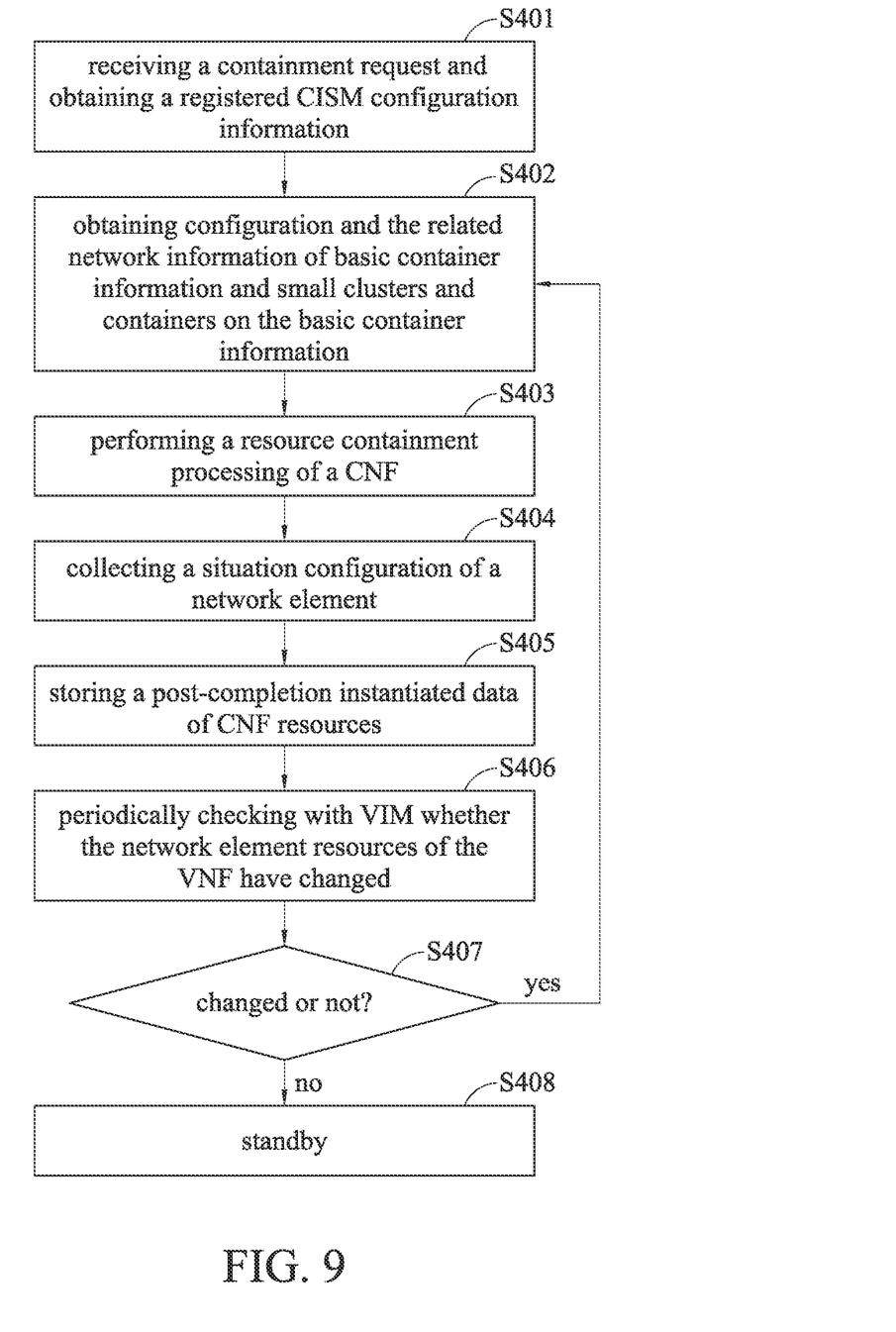
FIG. 9 is a flowchart of partial steps of the method according to the present disclosure.

The following step flowcharts in FIGS. 7 to 9 are used to explain the details of the procedures for the OAM system 1 of the present disclosure to perform management of various network elements. It should be understood that the steps shown in FIGS. 7 to 9 can also be understood by referring to the configuration relationship between the elements shown in FIGS. 1 to 6 to understand the interactions between an execution body and the related elements.

The steps shown in FIG. 7 describe a process by which the aforementioned NFVO 13 determines the type of network element corresponding to the containment request submitted by the user 11 to the OSS/BSS 12.

At step S201, the service request receiving and analysis management unit 131 of the NFVO 13 receives a containment request submitted by the user 11 from the OSS/BSS 12 regarding a specific network element. At this time, the information included in the containment request mainly comprises: a configuration information of the VIM 17 or CISM 16 that the user 11 wants to apply for synchronization, an order generated at the OSS/BSS 12, and an authority information of the user 11, etc.

At step S202, the service request receiving and analysis management unit 131 further queries a connection information of the underlying VIM 17 corresponding to VNFM 14 or VISM 16 corresponding to CNFM 15 via the service situation knowledge base 132 of the NFVO 13 according to the configuration information and the authority information described in the containment request.

At step S203, the service request receiving and analysis management unit 131 further analyzes the type of this specific network element based on the configuration information and the containment request analyzed in step S202. In detail, when it is determined that the type of this specific network element belongs to the VNF, the service request receiving and analysis management unit 131 sends the containment request (for example, via the Application Programing Interface (API)) to the VNFM 14 for related resource containment processing based on the connection information. On the other hand, if it is determined that the type of this specific network element belongs to the CNF, the service request receiving and analysis management unit 131 sends the containment request (for example, via the API) to CNFM 15 for related resource containment processing based on the connection information.

At step S204, the service request receiving and analysis management unit 131 stores a resource integration information (for example, a connection information in which VIM 17 that completes containing VNF 20 corresponds to VNFM 14 or a connection information in which CISM 16 that completes containing CNF 19 corresponds to CNFM 15) generated after the VNFM 14 or CNFM 15 has completed the resource containment processing of the VNF 20 or CNF 19 corresponding to the containment request (steps shown in FIG. 8 and FIG. 9) in the service situation knowledge base 132.

The steps shown in FIG. 8 describe a process in which the above-mentioned VNFM 14 executes the resource containment processing of the VNF 20 (continued to the above-mentioned step S203).

At step S301, the VNF service analysis receiving and management unit 141 of the VNFM 14 performs preliminary analysis on the containment request from the NFVO 13 (imported by the service request receiving and analysis management unit 131). At this time, the VNF service analysis receiving and management unit 141 queries the VNF network service resource management knowledge base 145 of the VNFM 14 for the registration status of the specific network element (it has been confirmed that its type is VNF at this time) corresponding to the containment request at the VIM 17 according to the configuration information of VIM 17 and the authority information of the user 11 described in the containment request. If it is found that this specific network element has not yet been registered at VIM 17 (that is, it does not belong to one of the VNFs 20 in the current MANO framework), the VNF service analysis receiving and management unit 141 will first conduct the containment management registration for this specific network element to VIM 17, and then update the configuration data of this specific network element after registration at VIM 17 to the VNF network service resource management knowledge base 145. Conversely, if it is found that this specific network element has been registered at VIM 17 (or after this specific network element has completed the containment management registration), the VNF service analysis receiving and management unit 141 will obtain the configuration data of the global VNF 20 (all are those who have completed the registration) at the current VIM 17 from the VNF network service resource management knowledge base 145 and send it to the VNF network element resource management unit 143 of the VNFM 14 together with the containment request.

At step S302, the VNF network element resource management unit 143 uses its built-in VNF network element collection and management interface application 144 to call the corresponding OpenStack Heat API at VIM 17 to obtain basic template stacks (Heat Stacks) corresponding to the global VNF 20 at VIM 17. Then, the VNF network element collection and management interface application 144 further obtains the configuration and related network information of the instances on each basic template stack via appropriate APIs (including but not limited to: APIs such as OpenStack Nova, Neutron, Cinder, etc.) for the aspect of each basic template stack.

At step S303, the VNF network element resource management unit 143 divides the VNF 20 according to the basic template stacks obtained in step S302 (a basic template stack represents a VNF 20), and processes the configuration and related network information of the instances on each basic template stack obtained in step S302 to calculate distribution nodes of the global VNF 20 (including the specific network element corresponding to the containment request) under the current MANO framework and the configuration data required after each VNF 20 is completed, so as to carry out the resource containment processing of the VNF 20 at the VIM 17.

At step S304, the VNF network element resource management unit 143 responds a post-completion data (a configuration data after completion) of all the VNFs 20 at the VIM 17 after completing the resource containment processing to the VNF service analysis receiving and management unit 141 by using an asynchronous message queue. The VNF service analysis receiving and management unit 141 instantiates the resources of the VNF 20 based on the post-completion data, and then stores them in the VNF network service resource management knowledge base 145, and completes the resource containment processing of the VNF 20.

At step S305, the VNF network element collection management scheduling application 142 built in the VNF service analysis receiving and management unit 141 periodically instructs the VNF network element resource management unit 143 to check with VIM 17 whether the network element resources (for example, check whether the instances on the basic template stack corresponding to each VNF 20 have been changed) of the VNF 20 contained in it have changed.

At step S306, it is determined based on an inspection result of the step S305: if there is a change (i.e., "Yes"), steps S302 to S303 are repeated to re-execute the resource containment processing for the VNF 20 contained at VIM 17; or, if there is no change (i.e., "No"), go to step S307 and wait for a next inspection by the VNF network element collection management scheduling application 142, or perform the resource containment processing of VNF 20 again in response to a receipt of a new containment request.

The steps shown in FIG. 9 describe a process in which the above-mentioned CNFM 15 executes the resource containment processing of the CNF 20 (continued to the above-mentioned step S203).

At step S401, the CNF service analysis receiving and management unit 151 of the CNFM 15 performs preliminary analysis on the containment request from the NFVO 13 (imported by the service request receiving and analysis management unit 131). At this time, the CNF service analysis receiving and management unit 151 queries the CNF network service resource management knowledge base 157 of the CNFM 15 for the registration status of the specific network element (it has been confirmed that its type is CNF at this time) corresponding to the containment request at the CISM 16 according to the configuration information of CISM 16 and the authority information of the user 11 described in the containment request. If it is found that this specific network element has not yet been registered at CISM 16 (that is, it does not belong to one of the CNFs 19 in the current MANO framework), the CNF service analysis receiving and management unit 151 will first conduct the containment management registration for this specific network element to CISM 16, and then update the configuration data of this specific network element after registration at CISM 16 to the CNF network service resource management knowledge base 157. Conversely, if it is found that this specific network element has been registered at CISM 16 (or after this specific network element has completed the containment management registration), the CNF service analysis receiving and management unit 151 will obtain the configuration data of the global CNF 19 (all are those who have completed the registration) at the current CISM 16 from the CNF network service resource management knowledge base 157 and send it to the CNF network element resource management unit 155 of the CNFM 15 together with the containment request.

At step S402, the CNF network element resource management unit 155 uses its built-in CISM container service management interface application 156 to call the corresponding Kubernetes API at CISM 16 to obtain basic container information corresponding to the global CNF 19 at CISM 16. Then, the CISM container service management interface application 156 further obtains the configuration and related network information of small clusters (POD) and containers on each basic container information via appropriate APIs (including but not limited to: APIs such as Kubernetes Core, Networking, CNI, etc.) for the aspect of each basic container information.

At step S403, the CNF network element resource management unit 155 divides the CNF 19 according to (corresponding to the basic container information of each CNF 19 obtained in step S402) a helm template and a Namespace, and processes the configuration and related network information of the small clusters and containers on each basic container information obtained in step S402 to calculate distribution nodes of the global CNF 19 (including the specific network element corresponding to the containment request) under the current MANO framework and the configuration data required after each CNF 19 is completed, so as to carry out the resource containment processing of the CNF 19.

At step S404, the CNF network element resource management unit 155 responds a post-completion data of all the CNFs 19 at the CISM 16 after completing the resource containment processing to the CNF service analysis receiving and management unit 151 by using an asynchronous message queue. At this time, the CNF service analysis receiving and management unit 151 informs the CNF network element situation configuration management unit 153 of the post-completion data, so as to collect the situation configurations of the 5G SA network elements via the built-in CNF network element open SBI interface application 154 for those who belong to the 5G SA network elements in the CNF 19 contained in the current MANO framework. Further, the CNF network element situation configuration management unit 153 responds to the CNF service analysis receiving and management unit 151 with an asynchronous message queue of the collected situation configurations.

Referring to the network elements 191 to 199 shown in FIG. 6 as an example, the CNF network element open SBI interface application 154 of the CNF network element situation configuration management unit 153 can first access a northbound SBI interface 195N on a NRF 195 (this is Nnrf SBI at this time), through nrfInfo specifications returned by a NFManagement Service API on the northbound SBI interface 195N to obtain the situation configuration of CNF 19 contained in the current MANO framework. For example, a supiRanges data recorded in a servedAusfInfo field and a servedUdmInfo field in the nrfInfo specification can be used to determine a valid user permanent identifier (Subscription Permanent Identifier, SUPI) range situation in a 5GC setting of the current MANO framework, and a taiList data recorded in a servedAmfInfo field in the nrfInfo specification can be used to determine the Tracking Area Identity (TAI) list on an AMF 196 in the 5GC setting of the current MANO framework. Then, the CNF network element open SBI interface application 154 may access these network elements via the respective northbound SBI interfaces 191N to 199N of the network elements 191 to 199 to obtain a more detailed situation configuration of the CNF 19.

At step S405, the CNF service analysis receiving and management unit 151 instantiates the resources of the CNF 19 based on the post-completion data and situation configuration returned by an asynchronous message queue (e.g., as described in steps S403 to S404), and then stores them in the CNF network service resource management knowledge base 157, and completes the resource containment processing of the CNF 19.

At step S406, the CNF network element collection management scheduling application 152 built in the CNF service analysis receiving and management unit 151 periodically instructs the CNF network element resource management unit 155 to check with CISM 16 whether the network element resources (for example, check whether the bean jam and container on the basic container information corresponding to each CNF 19 have been changed) of the CNF 19 contained in it have changed.

At step S407, it is determined based on an inspection result of the step S406: if there is a change (i.e., "Yes"), steps S402 to S406 are repeated to re-execute the resource containment processing for the CNF 19 contained at CISM 16; or, if there is no change (i.e., "No"), go to step S408 and wait for a next inspection by the CNF network element collection management scheduling application 152, or perform the resource containment processing of CNF 19 again in response to a receipt of a new containment request.

In addition, the present disclosure also discloses a computer readable medium, which is applied to a computing device or computer with a processor (for example, CPU, GPU, etc.) and/or memory, and stores instructions, and may use this computing device or computer to execute the computer readable medium via the processor and/or the memory, so as to execute the above-mentioned methods and steps when the computer-readable medium is executed.

In summary, the system and method for optimization of network function management and computer readable medium thereof of the present disclosure develop an OAM system architecture compatible with a standard MANO framework set by ETSI, so as to effectively integrate and manage the resources and situation configurations of the network elements (including VNF and CNF) of different manufacturers. Therefore, containment management for various network elements may be flexibly integrated, advantages of the standard MANO framework may be preserved, cost for customized development of various OAM systems and the information transmission therefrom may be reduced, and overall efficiency is increased.

The foregoing embodiments are provided for the purpose of illustrating the effects of the present disclosure, rather than limiting the present disclosure. Anyone skilled in the art can modify and alter the above embodiments without departing from the spirit and scope of the present disclosure. Therefore, the scope of protection with regard to the present disclosure should be as defined in the accompanying claims listed below.

What is claimed is:

1. A method for optimization of network function management and being employed in a management and orchestration framework or architecture, the method comprising:

analyzing a type of a network element corresponding to a containment request from the management and orchestration framework or architecture by a software network service orchestration control module; and executing a first resource containment processing of virtualized network functions by a software network service management module when the network element belongs to a type of the virtualized network functions, and executing a second resource containment processing of containerized network functions by a container network service management module when the network element belongs to a type of the containerized network functions.

2. The method of claim 1, wherein step of analyzing the type of the network element corresponding to the containment request from the management and orchestration framework or architecture by the software network service orchestration control module comprises following substeps:

querying a connection information by analyzing a configuration information and an authority information included in the containment request via a service request receiving and analysis management unit of the software network service orchestration control module; and returning the connection information by a service situation knowledge base of the software network service orchestration control module, wherein the connection information defines that a network resources and services for installing interface module at an underlayer of the management and orchestration framework or architecture corresponds to the software network service management module or a containerized service management module corresponds to the container network service management module, and wherein the software network service management module and the network resources and services for installing interface module are related to the first resource containment processing, and the containerized service management module and the container network service management module are related to the second resource containment processing.

3. The method of claim 1, wherein step of executing the first resource containment processing of the virtualized network functions by the software network service management module comprises following substeps:

in response to the containment request, obtaining a configuration data of the virtualized network functions registered at an underlayer of a network resources and services for installing interface module of the management and orchestration framework or architecture from a network service resource management knowledge base of the software network service management module via a service analysis receiving and management unit of the software network service management module;

obtaining basic template stacks including instances and network information in each of the virtualized network functions from the network resources and services for installing interface module via a network element resource management unit of the software network service management module;

dividing each of the virtualized network functions according to the basic template stacks by the network element resource management unit to calculate a post-completion configuration data required for each of the virtualized network functions according to configurations and the network information of the instances of each of the basic template stacks;

executing the first resource containment processing of each of the virtualized network functions to the network resources and services for installing interface module by the network element resource management unit to respond to the service analysis receiving and management unit with the post-completion configuration data completed the first resource containment processing; and instantiating the post-completion configuration data by the service analysis receiving and management unit to update the post-completion configuration data to the configuration data of the network service resource management knowledge base.

4. The method of claim 3, wherein step of executing the first resource containment processing of the virtualized network functions by the software network service management module further comprises following substeps:

periodically instructing the network element resource management unit to check the network resources and services for installing interface module for a change of each of the virtualized network functions by the service analysis receiving and management unit.

5. The method of claim 3, wherein step of executing the first resource containment processing of the virtualized network functions by the software network service management module further comprises following substeps:

registering the network element to the network resources and services for installing interface module by the service analysis receiving and management unit to update the configuration data of the network service resource management knowledge base.

6. The method of claim 1, wherein step of executing the second resource containment processing of the containerized network functions by the container network service management module comprises following substeps:

in response to the containment request, obtaining a configuration data of the containerized network functions registered in a containerized service management module at an underlayer of the management and orchestration framework or architecture from a network service resource management knowledge base of the container network service management module via a service analysis receiving and management unit of the container network service management module;

obtaining basic container information including small clusters, containers and network information in each of the containerized network functions from the containerized service management module via a network element resource management unit of the container network service management module;

dividing each of the containerized network functions according to a helm template and a namespace by the network element resource management unit to calculate a post-completion configuration data required for each of the containerized network functions according to configurations and the network information of the small clusters and the containers of each of the basic container information;

executing the second resource containment processing of each of the containerized network functions to the containerized service management module by the network element resource management unit to respond to the service analysis receiving and management unit with the post-completion configuration data completed the second resource containment processing;

analyzing and obtaining a situation configuration of each of the containerized network functions belonging to stand alone network elements according to the post-completion configuration data by a network element situation configuration management unit of the container network service management module; and instantiating the post-completion configuration data and the situation configuration by the service analysis receiving and management unit to update the post-completion configuration data and the situation configuration to the configuration data and the situation configuration of the network service resource management knowledge base.

7. The method of claim 6, wherein step of executing the second resource containment processing of the containerized network functions by the container network service management module further comprises following substeps:

periodically instructing the network element resource management unit to check the containerized service management module for a change of each of the containerized network functions by the service analysis receiving and management unit.

8. The method of claim 6, wherein step of executing the second resource containment processing of the containerized network functions by the container network service management module further comprises following substeps:

registering the network element to the containerized service management module by the service analysis receiving and management unit to update the configuration data of the network service resource management knowledge base.

9. A non-transitory computer readable storage medium being used in a computing device or a computer and storing instructions to execute the method for optimization of network function management of claim 1.

10. A system for optimization of network function management and being compatible with a management and orchestration framework or architecture, the system comprising:

a software network service orchestration control module, comprised within a processor, for analyzing a type of a network element corresponding to a containment request from the management and orchestration framework or architecture;

a software network service management module, comprised within the processor, for executing a first resource containment processing of virtualized network functions when the network element corresponding to the containment request belongs to a type of the virtualized network functions; and a container network service management module, comprised within the processor, for executing a second resource containment processing of containerized network functions when the network element corresponding to the containment request belongs to a type of the containerized network functions, wherein each of the software network service orchestration control module, the software network service management module, and the container network service management module is a hardware module or a firmware module.

11. The system of claim 10, wherein the software network service orchestration control module comprises:

a service request receiving and analysis management unit for querying a connection information based on a configuration information and an authority information included in the containment request; and a service situation knowledge base for maintaining the connection information, wherein the connection information defines that a network resources and services for installing interface module at an underlayer of the management and orchestration framework or architecture corresponds to the software network service management module or a containerized service management module corresponds to the container network service management module, and wherein the software network service management module and the network resources and services for installing interface module are related to the first resource containment processing, and the containerized service management module and the container network service management module are related to the second resource containment processing.

12. The system of claim 10, wherein the software network service management module comprises:
   a service analysis receiving and management unit for integrating a flow of the first resource containment processing according to the containment request;
   a network element resource management unit for executing the first resource containment processing of the virtualized network functions to the network resources and services for installing interface module at an underlayer of the management and orchestration framework or architecture; and
   a network service resource management knowledge base for maintaining a configuration data of the virtualized network functions registered at the network resources and services for installing interface module.

13. The system of claim 12, wherein a manner in which the software network service management module executes the first resource containment processing of the virtualized network functions comprises:
   in response to the containment request, obtaining the configuration data from the network service resource management knowledge base via the service analysis receiving and management unit;
   obtaining basic template stacks including instances and network information in each of the virtualized network functions from the network resources and services for installing interface module via the network element resource management unit;
   dividing each of the virtualized network functions according to the basic template stacks by the network element resource management unit to calculate a post-completion configuration data required for each of the virtualized network functions according to configurations and the network information of the instances of each of the basic template stacks;
   executing the first resource containment processing of each of the virtualized network functions to the network resources and services for installing interface module by the network element resource management unit to respond to the service analysis receiving and management unit with the post-completion configuration data completed the first resource containment processing; and
   instantiating the post-completion configuration data by the service analysis receiving and management unit to update the post-completion configuration data to the configuration data of the network service resource management knowledge base.

14. The system of claim 12, wherein the service analysis receiving and management unit is used to periodically instruct the network element resource management unit to check the network resources and services for installing interface module for a change of each of the virtualized network functions.

15. The system of claim 12, wherein the service analysis receiving and management unit is further used to register the network element to the network resources and services for installing interface module to update the configuration data of the network service resource management knowledge base.

16. The system of claim 10, wherein the container network service management module comprises:
   a service analysis receiving and management unit for integrating a flow of the second resource containment processing according to the containment request;
   a network element resource management unit for executing the second resource containment processing of the containerized network functions to a containerized service management module at an underlayer of the management and orchestration framework or architecture;
   a network element situation configuration management unit for collecting a situation configuration of the containerized network functions; and
   a network service resource management knowledge base for maintaining a configuration data and the situation configuration of the containerized network functions registered at the containerized service management module.

17. The system of claim 16, wherein a manner in which the container network service management module executes the second resource containment processing of the containerized network functions comprises:
   in response to the containment request, obtaining the configuration data from the network service resource management knowledge base via the service analysis receiving and management unit;
   obtaining basic container information including small clusters, containers and network information in each of the containerized network functions from the containerized service management module via the network element resource management unit;
   dividing each of the containerized network functions according to a helm template and a namespace by the network element resource management unit to calculate a post-completion configuration data required for each of the containerized network functions according to configurations and the network information of the small clusters and the containers of each of the basic container information;
   executing the second resource containment processing of each of the containerized network functions to the containerized service management module by the network element resource management unit to respond to the service analysis receiving and management unit with the post-completion configuration data completed the second resource containment processing;
   analyzing and obtaining the situation configuration of each of the containerized network functions belonging to stand alone network elements according to the post-completion configuration data by the network element situation configuration management unit; and
   instantiating the post-completion configuration data and the situation configuration by the service analysis receiving and management unit to update the post-completion configuration data and the situation configuration to the configuration data and the situation configuration of the network service resource management knowledge base.

18. The system of claim 16, wherein the service analysis receiving and management unit is used to periodically instruct the network element resource management unit to check the containerized service management module for a change of each of the containerized network functions.

19. The system of claim 16, wherein the service analysis receiving and management unit is further used to register the network element to the containerized service management module to update the configuration data of the network service resource management knowledge base.

* * * * *